US010075100B2

(12) United States Patent
Kim et al.

(10) Patent No.: US 10,075,100 B2
(45) Date of Patent: Sep. 11, 2018

(54) THREE DIMENSIONAL TRIBOELECTRIC ENERGY HARVESTER

(71) Applicant: Research and Business Foundation SUNGKYUNKWAN UNIVERSITY, Suwon-si (KR)

(72) Inventors: Sang Woo Kim, Yongin-si (KR); Kwon Hoon Han, Seoul (KR); Seong Su Kim, Seoul (KR); Wan Chul Seung, Yongin-si (KR); Sung Kyun Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 321 days.

(21) Appl. No.: 15/176,744

(22) Filed: Jun. 8, 2016

(65) Prior Publication Data

US 2016/0365808 A1    Dec. 15, 2016

(30) Foreign Application Priority Data

Jun. 9, 2015 (KR) .................. 10-2015-0080977

(51) Int. Cl.
    *H02N 1/04* (2006.01)
(52) U.S. Cl.
    CPC .................... *H02N 1/04* (2013.01)
(58) Field of Classification Search
    CPC ..................................................... H02N 1/04
    See application file for complete search history.

(56) References Cited

U.S. PATENT DOCUMENTS

| 9,190,936 | B2 * | 11/2015 | Naito | H02N 1/08 |
| 9,394,875 | B2 * | 7/2016 | Wang | F03B 13/14 |
| 2013/0076275 | A1 * | 3/2013 | Cohen | H02N 1/002 |
| | | | | 318/116 |
| 2015/0222203 | A1 * | 8/2015 | Kim | H02N 1/04 |
| | | | | 310/310 |
| 2016/0365808 | A1 * | 12/2016 | Kim | H02N 1/04 |
| 2017/0331397 | A1 * | 11/2017 | Kim | H02N 1/04 |
| 2018/0062543 | A1 * | 3/2018 | Jung | H02N 1/04 |

FOREIGN PATENT DOCUMENTS

| CN | 103780126 A | 5/2014 |
| CN | 103825489 A | 5/2014 |

OTHER PUBLICATIONS

Korean Office Action dated Jul. 8, 2016 in counterpart Korean Application No. 10-2015-0080977. (5 pages in Korean).

* cited by examiner

*Primary Examiner* — Robert W Horn
(74) *Attorney, Agent, or Firm* — NSIP Law

(57) ABSTRACT

There is provided a three-dimensional triboelectric energy generator comprising: a moving object; at least two triboelectric energy generator modules defining at least two planes respectively, wherein the moving object is disposed between the least two planes; and at least two elastic members configured to couple the moving object to the at least two triboelectric energy generator modules respectively, wherein a movement of the moving object allows each of the at least two triboelectric energy generator modules to generate a triboelectric energy.

11 Claims, 9 Drawing Sheets

$$I = \frac{A\Delta\rho_s}{\Delta t} = \frac{A\rho_s}{l}v(x) = 100\ nA$$

A(ELECTRODE AREA) = 0.0001m²
$v$(VELOCITY) = 1m/s
$\rho_s$(CHARGE DENSITY) = 10μC/m²
$l$(MOVING DISTANCE) = 1cm $V_{OC} = V_B - V_A = 500\ V$

THREE DIMENSIONAL TRIBOELECTRIC ENERGY HARVESTER

CROSS-REFERENCE TO RELATED APPLICATION

This application claims the benefit of Korea Patent Application No. 10-2015-0080977 filed on Jun. 9, 2015, the entire content of which is incorporated herein by reference for all purposes as if fully set forth herein.

BACKGROUND

Field of the Present Disclosure

The present disclosure relates to a triboelectric energy generator, and, more particularly, to a three-dimensional triboelectric energy generator to harvest electrical energies from micro-mechanical energies in a more spatial-efficient manner.

Discussion of the Related Art

The triboelectric effect is a type of contact electrification in which certain materials become electrically charged after they come into frictional contact with a different material. For example, rubbing glass with fur, or a comb through the hair, can build up triboelectricity. The polarity and strength of the charges produced differ according to the materials, surface roughness, temperature, strain, and other properties. An energy harvester using friction-to-electric conversion is a new eco-friendly electric-generator to convert a wasted mechanical energy resulting from human movement or external microscopic vibration to an electric energy. That is, this energy harvester is different from a previous solar cell, wind energy generator, fuel cell, etc. in terms of an energy harvesting manner.

The triboelectric energy generator may convert a mechanical energy to an electrical energy. However, the state-of-the art triboelectric energy generator may be poor at conversion of micro mechanical energies to electrical energies. With a conventional energy harvesting device, external three-dimensional micro-mechanical energies application may lead only to two-dimensional forces application in view of two contacting elements. Thus, one dimensional force may be lost. As shown in FIG. 1A and FIG. 1B, a conventional triboelectric energy harvester may harvest energies based on the two-dimensional force. For example, as shown in FIG. 1A, the conventional triboelectric energy harvester may harvest energies based on a vertical movement (y axial direction) (this type may be referred to as a push type). Alternatively, as shown in FIG. 1B, the conventional triboelectric energy harvester may harvest energies based on a horizontal movement (y axial direction) (this type may be referred to as a slide type). That is, the energy may be harvested based on only the two-dimensional force. Thus, one dimensional force may be lost.

Therefore, there is a need for a triboelectric energy harvester configured to be sensitive to a three-dimensional force.

A relevant prior art may be as follows: US 20140246950 A1 (2014, Sep. 4); Flexible triboelectric generator, Nano Energy, 2012, 1 (2), 328-334 (NPL: non-patent literature).

SUMMARY

The present disclosure provides a triboelectric energy generator to convert a micro-mechanical energy to an electrical energy more efficiently. More specifically, the present disclosure provides a triboelectric energy generator configured to convert a micro-mechanical energy to an electrical energy efficiently by harvesting electrical energies in a three-dimensional manner from external three-dimensionally-applied mechanical forces. This may overcome a shortcoming of a conventional triboelectric energy generator configured to convert the external dimensional forces to the electrical energies only in a two-dimensional manner.

In one aspect, there is provided a three-dimensional triboelectric energy generator comprising: a moving object; at least two triboelectric energy generator modules defining at least two planes respectively, wherein the moving object is disposed between the least two planes; and at least two elastic members configured to couple the moving object to the at least two triboelectric energy generator modules respectively, wherein a movement of the moving object allows each of the at least two triboelectric energy generator modules to generate a triboelectric energy.

In one embodiment, each of the triboelectric energy generator modules comprises a substrate directly coupled to a corresponding elastic member; at least two first friction-charged members on the substrate facing away the elastic member, wherein the at least two first friction-charged members are spaced from each other; a second friction-charged member on the first friction-charged members, wherein the second friction-charged member faces away the substrate; and a plurality of electrodes on the second friction-charged member, wherein the plurality of electrodes faces away the first friction-charged member, wherein the electrodes are spaced from each other.

In one embodiment, the first friction-charged member and second friction-charged member have different materials from each other.

In one embodiment, the at least two first friction-charged members have the same area size.

In one embodiment, the plurality of electrodes has the same area size.

In one embodiment, each of the at least two first friction-charged members has the same area size as that of each of the plurality of electrodes.

In one embodiment, one pair of adjacent electrodes among the plurality of electrodes defines one set of electrodes, wherein two electrodes in each electrode set are coupled to two current collection lines respectively, and each energy storage is coupled between the two current collection lines for each electrode set.

In one embodiment, a rectifier diode is coupled between the energy storage and at least one of the two current collection lines.

In one embodiment, each first friction-charged member is made of aluminum and the second friction-charged member is made of a polytetrafluoroethylene.

In one embodiment, the moving object includes a moving weight.

In one embodiment, the at least two triboelectric energy generator modules include six triboelectric energy generator modules.

In accordance with the present disclosure, the energy harvesting device may be achieved which may be very sensitive to the external micro-mechanical force. This device may have applications for sensors or energy collection apparatuses.

Further, in accordance with the present disclosure, due to an elastic force of the elastic member in the energy harvester, only a single-time external micro-mechanical force application may lead to multiple energy generations.

When the present energy harvesting device is applied to a wearable device, a portable device, etc., the present energy harvesting device may act as an energy supply source thereto. In one example, when the present energy harvesting device is applied to a smartphone, a vibration energy or mechanical energy resulting from the human movement may lead to an efficient electrical energy generation which may be used to drive the smartphone or extend a drive time thereof.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

Figure 1A:
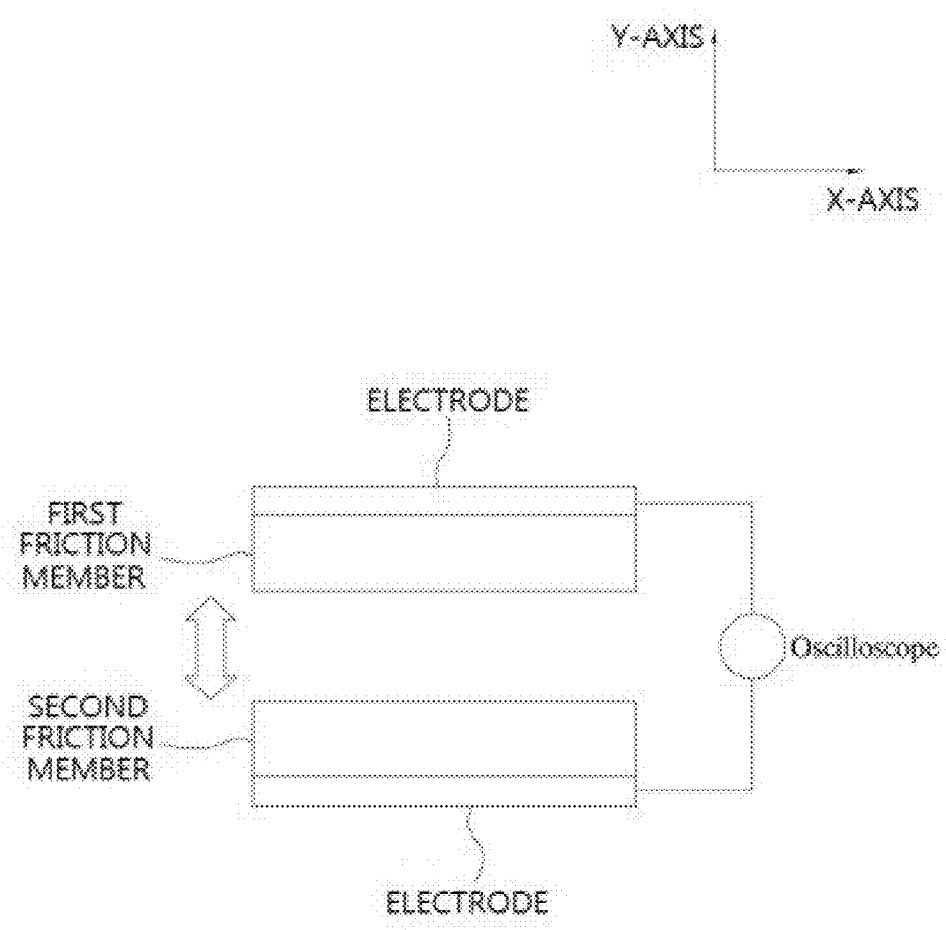
FIG. 1A and FIG. 1B show an example of a triboelectric energy harvester based on a two-dimensional force in accordance with a prior art.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

DETAILED DESCRIPTIONS

Examples of various embodiments are illustrated in the accompanying drawings and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Example embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

Hereinafter, embodiments of the present disclosure will be described in details with reference to attached drawings.

The present disclosure provides a triboelectric energy generator configured to convert a micro-mechanical energy to an electrical energy efficiently by harvesting electrical energies in a three-dimensional manner from external three-dimensionally-applied mechanical forces. This may overcome a shortcoming of a conventional triboelectric energy generator configured to convert the external three-dimensional forces to the electrical energies only in a two-dimensional manner.

Figure 1B:
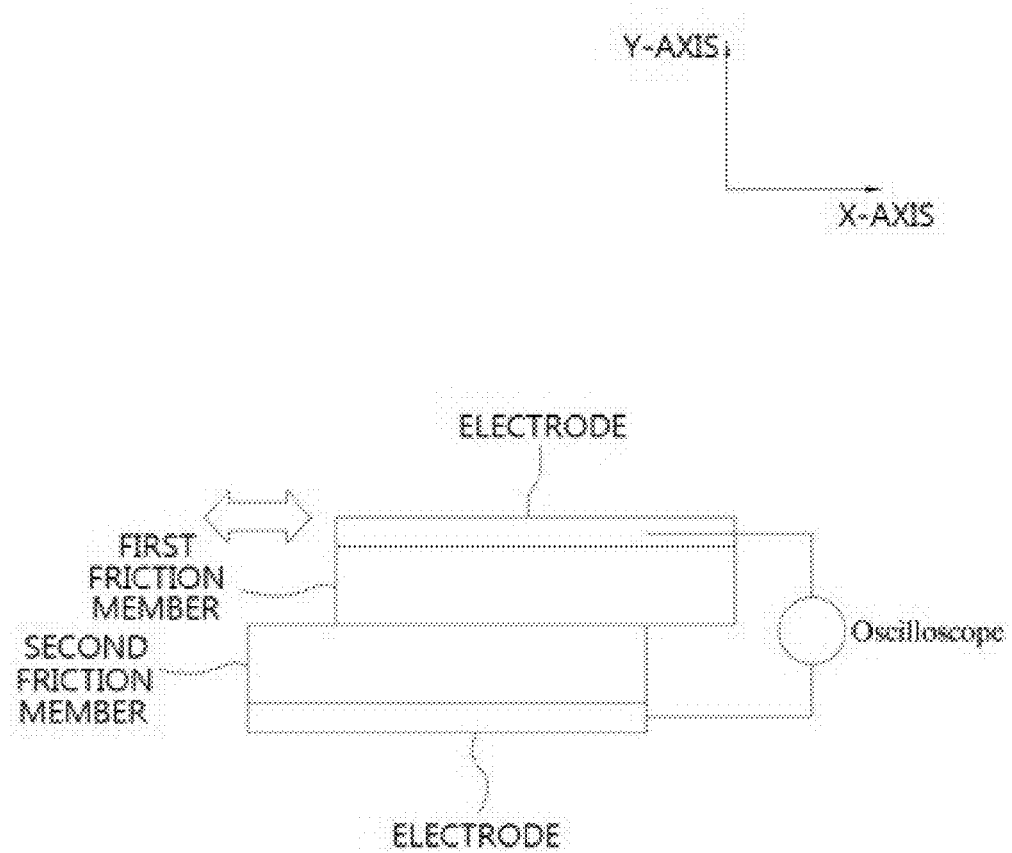

As described above with reference to FIG. 1A and FIG. 1B, the conventional triboelectric energy generator harvests electrical energies based on the two-dimensional force. Thus, one dimensional force may be lost.

In order to overcome the shortcoming of the conventional triboelectric energy generator, a triboelectric energy generator in accordance with one embodiment of the present disclosure comprises a moving object; at least two triboelectric energy generator modules defining at least two planes respectively, wherein the moving object is disposed between the least two planes; and at least two elastic members configured to couple the moving object to the at least two triboelectric energy generator modules respectively, wherein a movement of the moving object allows each of the at least two triboelectric energy generator modules to generate a triboelectric energy.

Figure 2:
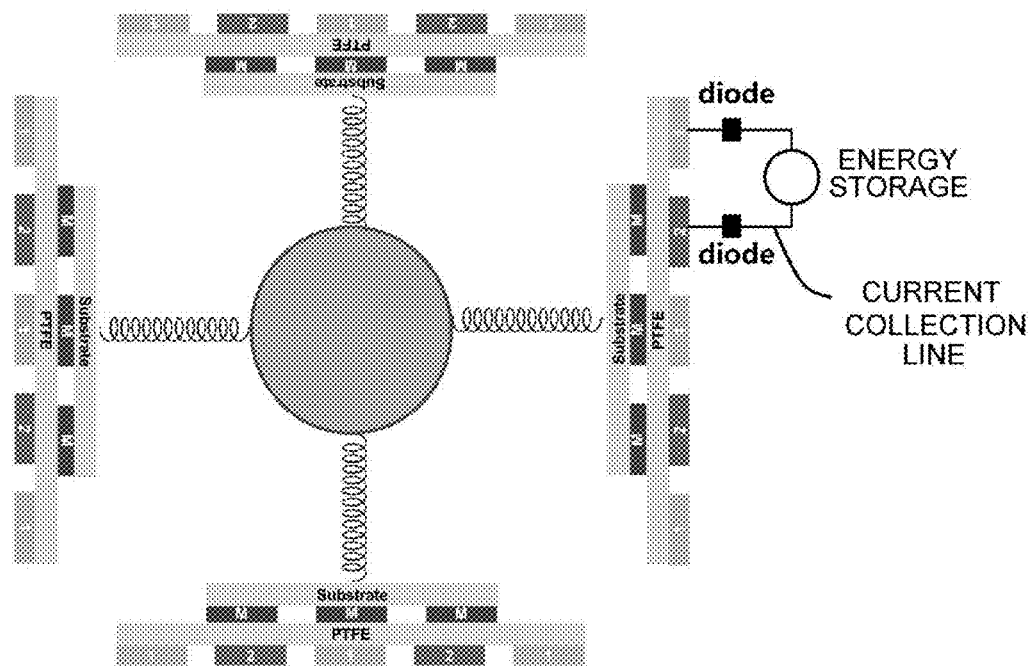
FIG. 2 shows a two-dimensional representation of a three-dimensional triboelectric energy generator in accordance with one embodiment of the present disclosure.

FIG. 2 shows a two-dimensional representation of a three-dimensional triboelectric energy generator in accordance with one embodiment of the present disclosure.

Referring to FIG. 2, the moving object is shown to be a weight located centrally in a space defined by surrounding triboelectric energy generator modules. The moving object is not limited to the weight such as a pendulum. The moving object may not be limited specifically in terms of a size, shape, and/or material as long as it has a given mass and serves to realize a physical connection between the elastic members and triboelectric energy generator modules. The moving object may be disposed in the center of the generator.

The elastic member is shown to be a coil spring as shown in FIG. 2. However, the present disclosure is not limited thereto. The elastic member may not be limited specifically in terms of a material and/or configuration and/type as long as it exerts an elastic force. When the external force is applied to the present energy generator, the elastic member may receive a mechanical energy from a movement of the moving object resulting from the external force and then transfer the mechanical energy to the corresponding triboelectric energy generator module coupled thereto. For example, the elastic member may include a spring, or a MEMS (micro-electrical mechanical structure) elastic element. In one example, a coil spring is embodied as the elastic member as shown in FIG. 2. Further, using the elastic member between the moving object or weight and triboelectric energy generator module, only a single-time external (micro-) mechanical force application may lead to multiple energy generations. In other words, a single-time external (micro-) mechanical force application may lead to repeated vibrations of the elastic member which may lead to multiple energy generations, which may result in an increase in power generation.

Figure 3:
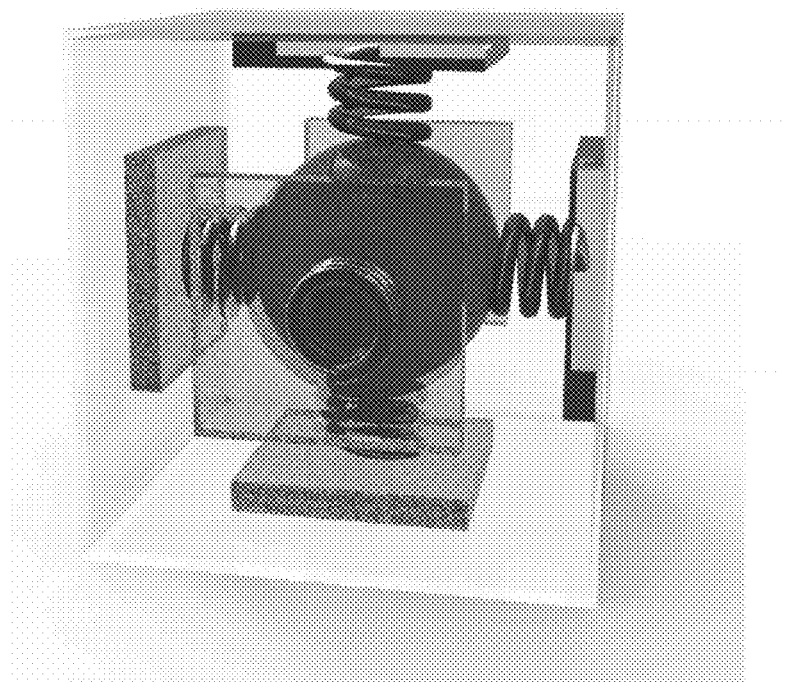
FIG. 3 shows a three-dimensional representation of a three-dimensional triboelectric energy generator in accordance with one embodiment of the present disclosure.

The triboelectric energy generator modules may surround the moving object as shown in FIG. 2. The present disclosure is not limited thereto. The triboelectric energy generator modules may define at least seven planes respectively. Alternatively, the triboelectric energy generator modules may define two to fifth planes respectively. Although, in this embodiment, only four triboelectric energy generator modules are shown in FIG. 2 which represents the triboelectric energy generator in a two dimension, the triboelectric energy generator has actually the six triboelectric energy generator modules as shown in FIG. 3 which represents in a three dimension.

The number of the triboelectric energy generator modules may not be limited specifically. In one representative example, the number of the triboelectric energy generator modules is six as shown in FIG. 3. This may lead to a three-dimensional triboelectric energy generator.

When an external force, for example, in a form of vibration is applied to the present three-dimensional triboelectric energy generator, the triboelectric energy generator modules may generate triboelectric energies individually. As shown, each triboelectric energy generator module may be coupled via a corresponding elastic member to the (central located) moving object.

As shown in FIG. 2, each triboelectric energy generator module includes a substrate directly coupled to a corresponding elastic member; at least two first friction-charged members on the substrate facing away the elastic member, wherein the at least two first friction-charged members are spaced from each other; a second friction-charged member on the first friction-charged members, wherein the second friction-charged member faces away the substrate; and a plurality of electrodes on the second friction-charged member, wherein the plurality of electrodes faces away the first friction-charged member, wherein the electrodes are spaced from each other.

In FIG. 2, each of the plurality of first friction-charged member is denoted as "M". The second friction-charged member is denoted as "PTFE". The electrodes are denoted using numerals "1", and "2".

The substrate may not be limited specifically in terms of a material and/or size and/type as long as it serves to support the first friction-charged members. On the substrate, at least two first friction-charged member may be disposed. The substrate may have opposite faces coupled to the moving object and first friction-charged members respectively.

The first friction-charged members may be spaced from each other at a predetermined interval. Each of the first friction-charged members may be made of a metal. The present disclosure is not limited thereto. Each of the first friction-charged members may not be limited specifically in terms of a material as long as its material is different from that of the second friction-charged member to realize the triboelectric effect.

It may be preferable that the first and second friction-charged members different charging properties, which means that the first and second friction-charged members are located at different positions in a triboelectric series. It may be preferable that the different positions in the triboelectric series are more far away from each other, which means that a difference between the charging properties of the first and second friction-charged members is larger. The larger difference may lead to a larger triboelectric amount.

The second friction-charged member may contact the first friction-charged members. The first friction-charged member and second friction-charged member may have a mutual-sliding contact relationship. When the moving weight moves via the external force application, the moving weight may transfer the force to the elastic member which, in turn, may transfer the force to the corresponding triboelectric generator module. Thus, the force may move the substrate and thus the first friction-charged member fixed onto the substrate moves along the substrate. Thus, the first friction-charged member may slide along and on the second friction-charged member. This sliding movement may generate the triboelectric effect, as will be described below with reference to FIG. 4A to FIG. 4C.

The plurality of electrodes may be disposed on the second friction-charged member to face away the first friction-charged members. The plurality of electrodes may be spaced from each other at a predetermined distance. The electrodes may be assigned numerals 1 and 2 alternately. The sliding movement between the first friction-charged member and second friction-charged member may allow currents to flow between adjacent electrodes due to potential differences therebetween. This will be described below in details with reference to FIG. 4A to FIG. 4C.

To support the electrodes and second friction-charged member, an additional substrate may be disposed beneath the electrodes, which is shown in FIG. 6A. The further substrate may be made of acryl.

Figure 4A:
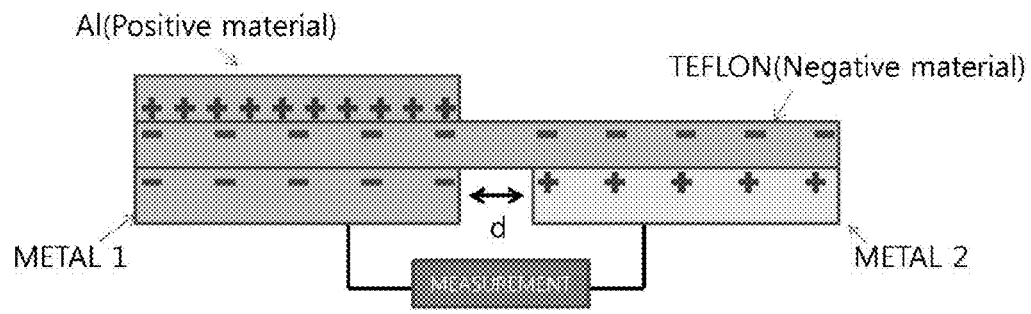
FIG. 4A to FIG. 4C illustrate cross-sectional views for explaining a triboelectric energy generation mechanism using a three-dimensional triboelectric energy generator in accordance with one embodiment of the present disclosure.
Figure 4B:
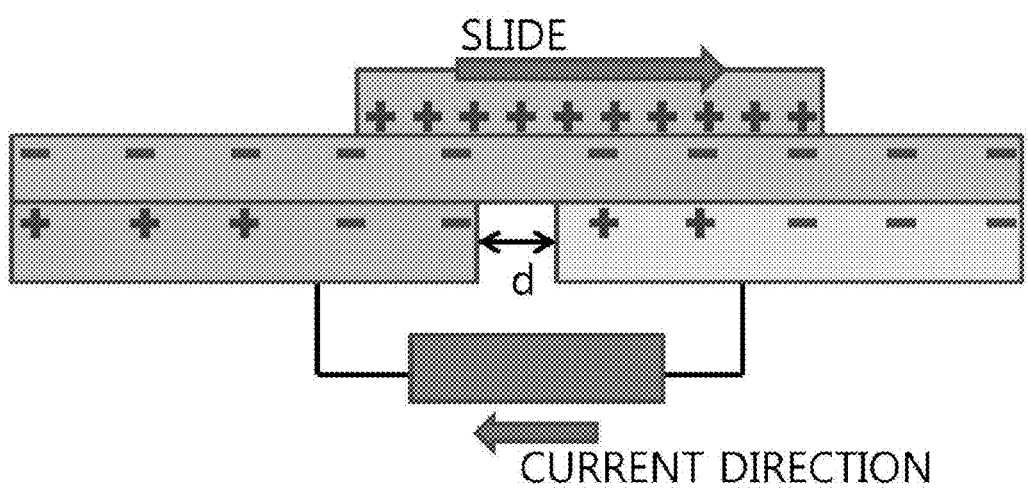
Figure 4C:
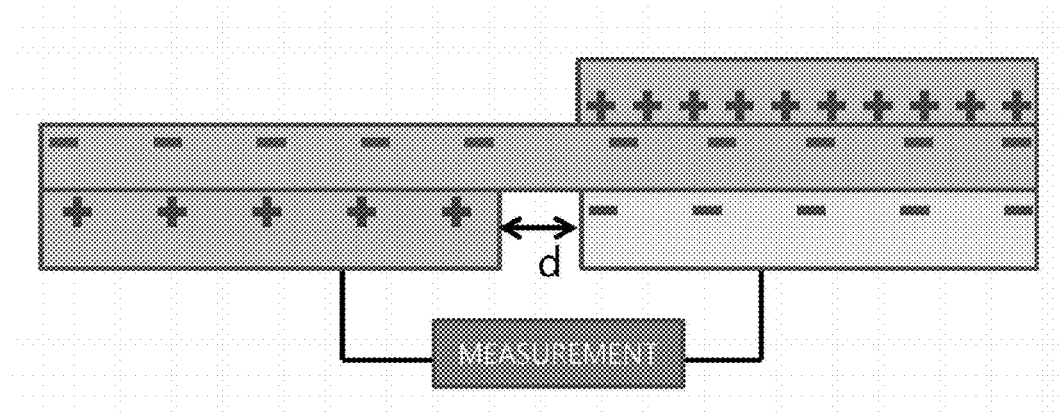

FIG. 4A to FIG. 4C illustrate cross-sectional views for explaining a triboelectric energy generation mechanism using a three-dimensional triboelectric energy generator in accordance with one embodiment of the present disclosure.

The triboelectric energy generation may occur as follows: contact and separation between two different materials may cause the static electricity which in turn may cause a difference between electric charges for the two materials, which may generate the triboelectric energy.

FIG. 4A to FIG. 4C illustrate only the triboelectric energy generator module to describe the triboelectric energy generation. In this example, the first friction-charged member is made of aluminum (Al) and the second friction-charged member is made of polytetrafluoroethylene (Teflon). The aluminum (Al) has a relatively positive position in the triboelectric series, while the polytetrafluoroethylene has a relatively negative position in the triboelectric series.

FIG. 4A shows a state in which a charge state reaches an equilibrium between the Al and polytetrafluoroethylene. The friction between Al and polytetrafluoroethylene may allow charges to move. In this case, a first electrode vertically overlapping via the second friction-charged member with the first friction-charged member may be charged negatively in order to achieve an equilibrium state in a charge. The second electrode not overlapping with the first friction-charged member may be charged positively in order to achieve an equilibrium state in a charge.

Thereafter, as shown in FIG. 4B, the external force may allow the first friction-charged member made of Al to slide on and along the second friction-charged member made of polytetrafluoroethylene. Thus, the first friction-charged member made of Al may partially overlap the second electrode, such that the electrons may migrate from the first electrode to the second electrode in order to achieve an equilibrium state in a charge. Thus, the electric current may flow between the first and second electrodes as denoted as metal 1 and 2 respectively.

Finally, as shown in FIG. 4C, the first friction-charged member made of Al may fully slide on and along the second friction-charged member made of polytetrafluoroethylene. Thus, the first friction-charged member made of Al may entirely overlap the second electrode, to achieve an equilibrium state in a charge. Thus, the electric current may not flow between the first and second electrodes as denoted as metal 1 and 2 respectively.

In this way, whenever a micro-mechanical force enables the movement of the first friction-charged member, the current may flow. Thus, more triboelectric energy generator modules may involve triboelectric energy generations in a three dimensional manner. Thus, the present three-dimensional triboelectric energy generator may generate a larger amount of electric power from the micro-mechanical energy than the conventional triboelectric energy generator.

It may be preferable that at least two first friction-charged members have the same area size or the same contact size. This may lead to energy harvesting with a predictable and reliable magnitude thereof. Further, it may be preferable that the plurality of electrodes have the same area size or the same contact size. This may lead to energy harvesting with a predictable and reliable magnitude thereof. Further, it may be more preferable that each of the at least two first friction-charged members has the same area size as that of each of the plurality of electrodes. This may lead to energy harvesting with a predictable and reliable magnitude thereof. In this connection, when the present three-dimensional triboelectric energy generator is applied to a mobile device or wearable device, an electrical energy with a predictable and reliable magnitude may be acquired to be supplied thereto. The area size or interval may vary depending on specific applications.

In order to collect the generated triboelectric energy, the present three-dimensional triboelectric energy generator may include current collection lines and energy storage coupled thereto as shown in FIG. 2. The arrangement of the collection lines and energy storage and electrodes as shown in FIG. 2 is merely one example. Thus, the arrangement of the collection lines and energy storage and electrodes may vary in order to collect and store the generated energy.

More specifically, one pair of adjacent electrodes among the plurality of electrodes defines one set of electrodes, wherein two electrodes in each electrode set are coupled to two current collection lines respectively, and each energy storage is coupled between the two current collection lines for each electrode set. Further, a rectifier diode may be coupled between the energy storage and at least one of the two current collection lines.

As used herein, an energy collection module may include the electrode and collection lines. The energy storage may be embodied as a capacitor. The rectifier diode may be coupled between the energy storage and the energy collection module. The rectifier diode may act to allow one-directional current flow to prevent the capacitor from being discharged.

Figure 5:
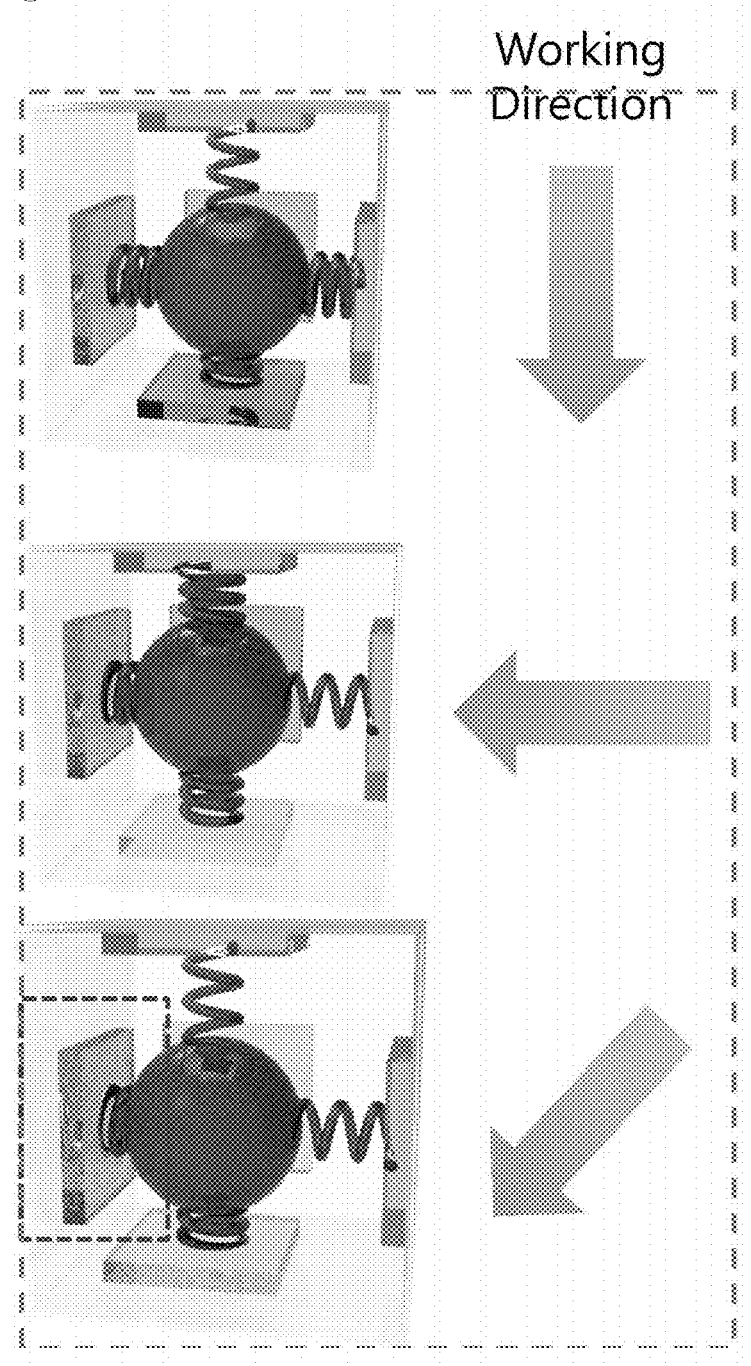
FIG. 5 illustrates triboelectric energy generation aspects based on force application directions using a three-dimensional triboelectric energy generator in accordance with one embodiment of the present disclosure.

FIG. 5 illustrates triboelectric energy generation aspects based on force application directions using a three-dimensional triboelectric energy generator in accordance with one embodiment of the present disclosure. As shown in FIG. 5, the present three-dimensional triboelectric energy generator may generate the triboelectric energy via applications of all directions of the mechanical forces. Thus, the present three-dimensional triboelectric energy generator may generate the larger triboelectric energy more efficiently than the conventional two-dimensional triboelectric energy generator.

As described above, the present three-dimensional triboelectric energy generator may be configured to generate the larger triboelectric energy more efficiently than the conventional two-dimensional triboelectric energy generator. Thus, the present three-dimensional triboelectric energy generator may be applied not only to micro-size applications but also to macro-size applications. The application size choice may be made by the skilled person to the art based on which type of applications the present three-dimensional triboelectric energy generator will have. The present three-dimensional triboelectric energy generator may not be limited to the micro size application.

Figure 6:
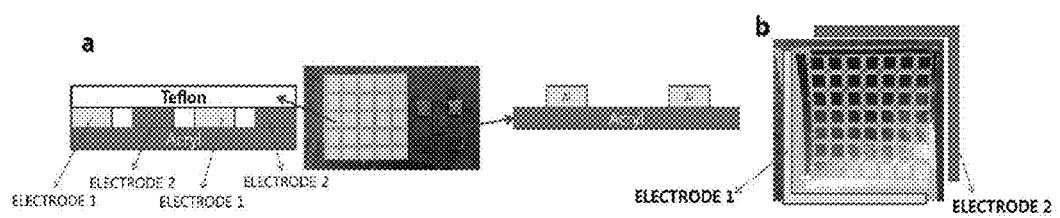
FIG. 6 illustrates views of an actual fabricated three-dimensional triboelectric energy generator in accordance with one embodiment of the present disclosure.

FIG. 6 illustrates views of an actual fabricated three-dimensional triboelectric energy generator in accordance with one embodiment of the present disclosure. In FIG. 6. the second friction-charged member is made of polytetrafluoroethylene and the first friction-charged member is made of Al. FIG. 6a shows a friction occurring portion for an experimental sample for the present three-dimensional triboelectric energy generator module. FIG. 6b shows a non-friction portion for an experimental sample for the present three-dimensional triboelectric energy generator module. Specifically, FIG. 6b shows the back face of the present three-dimensional triboelectric energy generator module where a matrix of the electrodes 1 and 2 is patterned on a further substrate made of acryl.

In FIG. 6a, a white face portion shows each present triboelectric energy generator module employing polytetrafluoroethylene corresponding to each plane of six planes surrounding the moving object. Adjacent to the white face portion, six present triboelectric energy generator modules corresponding to the six planes respectively are shown to be arranged in a matrix for an illustration thereof in a small size.

As shown in FIG. 6b, the electrodes are arranged in a matrix form. The electrode 1 and electrode 2 may be alternated in each of rows and columns. Thus, in a first diagonal direction, only the electrodes 1 may be arranged side by side, while a second diagonal direction opposite the first diagonal direction, only the electrodes 2 may be arranged side by side. FIG. 6 is merely one example of the actual fabricated three-dimensional triboelectric energy generator.

The present disclosure may not be limited thereto.

Figure 7:
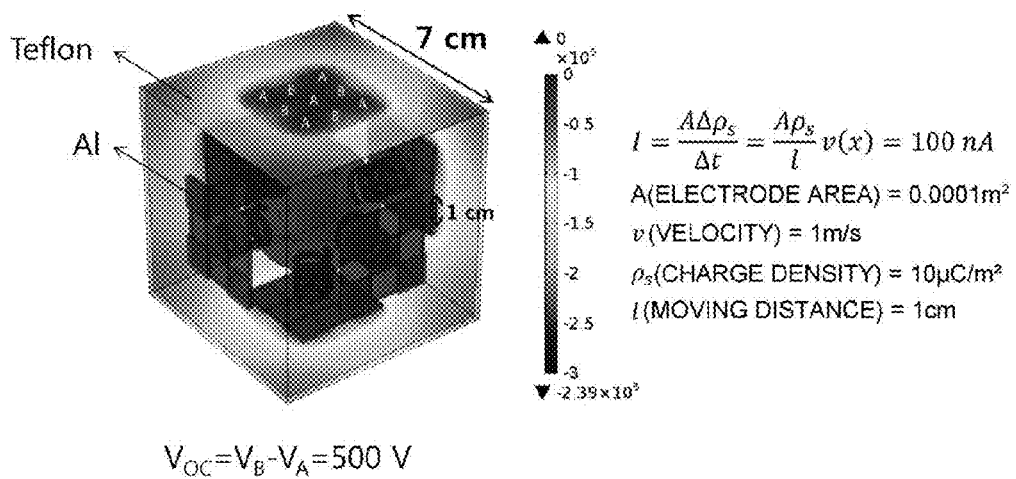
FIG. 7 illustrates a simulation using a three-dimensional triboelectric energy generator in accordance with one embodiment of the present disclosure.

FIG. 7 illustrates a simulation using a three-dimensional triboelectric energy generator in accordance with one embodiment of the present disclosure. For this simulation, the six present triboelectric energy generator modules corresponding to the six planes may be employed. As shown in FIG. 7, for each plane, an electrical potential may occur. This may prove that the actual fabricated three-dimensional triboelectric energy generator in accordance with one embodiment of the present disclosure may be more sensitive to three-dimensional mechanical energies. For this, the simulation of FIG. 7 employs a Comsol simulation program. The simulation results will be described in details with reference to FIG. 8.

Figure 8:
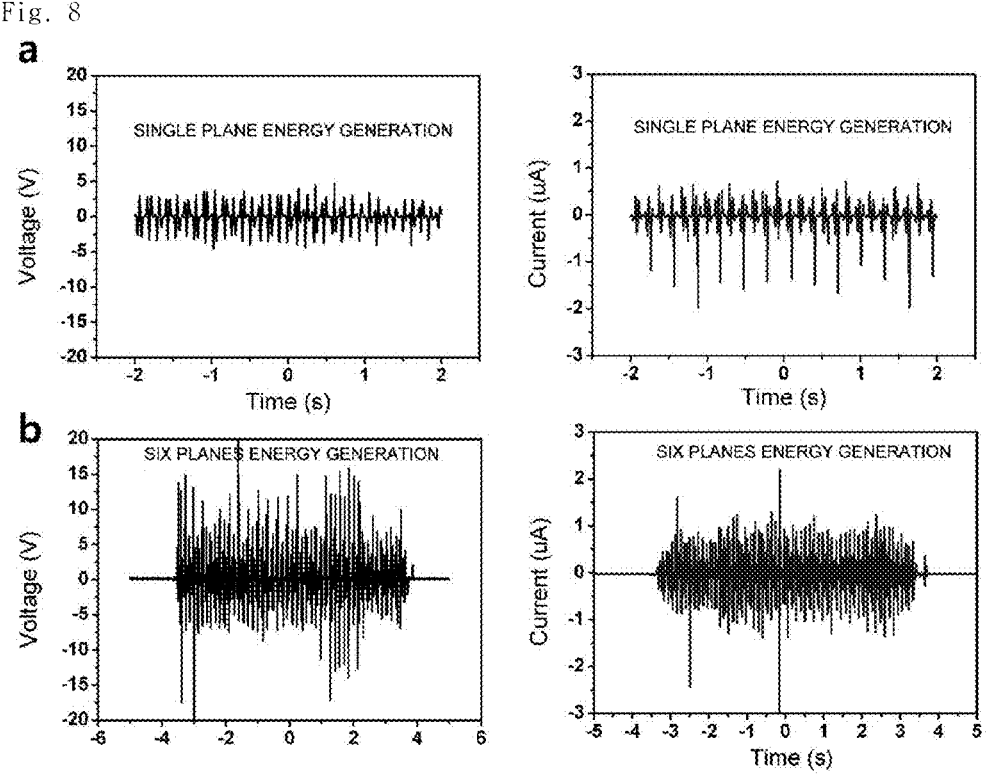
FIG. 8 illustrates comparisons between triboelectric energy generations resulting respectively from using single and six planes of a three-dimensional triboelectric energy generator in accordance with one embodiment of the present disclosure.

FIG. 8 illustrates comparisons between triboelectric energy generations resulting respectively from using single and six planes of a three-dimensional triboelectric energy generator in accordance with one embodiment of the present disclosure. For the comparisons, an elastic member is embodied as a spring having a diameter 0.3 cm, and a length 2 cm, and the moving object is embodied as a weight with a size 0.7×0.7×0.07 cm and made of tungsten. Further, the applied external force is embodied as a vibration with about a 2 Hz frequency.

As shown in FIG. 8a, when the force is applied to a single plane, about 2V energy occurs. To the contrary, as shown in FIG. 8b, when the force is applied to six planes, about 10 to 15V energy occurs. This may prove that the actual fabricated three-dimensional triboelectric energy generator in accordance with one embodiment of the present disclosure may be more sensitive to three-dimensional mechanical energies and may generate the triboelectric energy more spatial-efficiently.

In FIG. 8, the energy generator modules define six planes surrounding the moving object respectively. However, the present disclosure may not be limited thereto. for example, the energy generator modules define at least seven planes surrounding the moving object respectively.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:

1. A three-dimensional triboelectric energy generator comprising:
   a moving object;
   at least two triboelectric energy generator modules defining at least two planes respectively, wherein the moving object is disposed between the least two planes; and
   at least two elastic members configured to couple the moving object to the at least two triboelectric energy generator modules respectively,
   wherein a movement of the moving object allows each of the at least two triboelectric energy generator modules to generate a triboelectric energy.

2. The generator of claim 1, wherein each of the triboelectric energy generator modules comprises:
   a substrate directly coupled to a corresponding elastic member;
   at least two first friction-charged members on the substrate facing away the elastic member, wherein the at least two first friction-charged members are spaced from each other;

a second friction-charged member on the first friction-charged members, wherein the second friction-charged member faces away the substrate; and a plurality of electrodes on the second friction-charged member, wherein the plurality of electrodes faces away the first friction-charged member, wherein the electrodes are spaced from each other.

3. The generator of claim 2, wherein the first friction-charged member and second friction-charged member have different materials from each other.

4. The generator of claim 2, wherein the at least two first friction-charged members have the same area size.

5. The generator of claim 2, wherein the plurality of electrodes has the same area size.

6. The generator of claim 2, wherein each of the at least two first friction-charged members has the same area size as that of each of the plurality of electrodes.

7. The generator of claim 2, wherein one pair of adjacent electrodes among the plurality of electrodes defines one set of electrodes, wherein two electrodes in each electrode set are coupled to two current collection lines respectively, and each energy storage is coupled between the two current collection lines for each electrode set.

8. The generator of claim 7, wherein a rectifier diode is coupled between the energy storage and at least one of the two current collection lines.

9. The generator of claim 2, wherein each first friction-charged member is made of aluminum and the second friction-charged member is made of a polytetrafluoroethylene.

10. The generator of claim 1, wherein the moving object includes a moving weight.

11. The generator of claim 1, wherein the at least two triboelectric energy generator modules include at least six triboelectric energy generator modules.

* * * * *